US011507763B2

(12) United States Patent
Vitello

(10) Patent No.: US 11,507,763 B2
(45) Date of Patent: Nov. 22, 2022

(54) APPARATUS, METHOD, AND SYSTEM FOR CAPTURING AND RE-MANUFACTURING WASTE

(71) Applicant: Atacama Manufacturing Inc., Albany, OR (US)

(72) Inventor: Chris Vitello, Corvallis, OR (US)

(73) Assignee: Atacama Manufacturing Inc., Albany, OR (US)

( * ) Notice: Subject to any disclaimer, the term of this patent is extended or adjusted under 35 U.S.C. 154(b) by 0 days.

(21) Appl. No.: 17/010,580

(22) Filed: Sep. 2, 2020

(65) Prior Publication Data
US 2021/0064833 A1 Mar. 4, 2021

Related U.S. Application Data

(60) Provisional application No. 62/895,294, filed on Sep. 3, 2019.

(51) Int. Cl.
*G06K 7/10* (2006.01)
*G06Q 10/00* (2012.01)
*G06K 7/14* (2006.01)

(52) U.S. Cl.
CPC ....... *G06K 7/10861* (2013.01); *G06K 7/1404* (2013.01); *G06Q 10/30* (2013.01)

(58) Field of Classification Search
CPC .. G01G 19/414; B65G 69/14; B65G 2201/02; G06Q 10/30; G06Q 20/065; G06Q 2220/00; G07F 7/06; G06K 7/10861; G06K 7/1404
USPC ..................................... 705/308; 235/462.01
See application file for complete search history.

(56) References Cited

U.S. PATENT DOCUMENTS

| 4,248,334 | A | * | 2/1981 | Hanley | ................. G07F 7/0609 194/209 |
|---|---|---|---|---|---|
| 5,372,317 | A | * | 12/1994 | Willis | ................. B02C 19/0087 241/99 |
| 8,851,265 | B2 | * | 10/2014 | Morishita | ................. B28B 3/02 194/208 |
| 2011/0253818 | A1 | * | 10/2011 | Jeon | ...................... B65F 1/0033 241/81 |
| 2019/0017863 | A1 | * | 1/2019 | Saltzman | ............... B65G 69/14 |
| 2020/0407094 | A1 | * | 12/2020 | Zhang | ..................... B29B 17/02 |

\* cited by examiner

*Primary Examiner* — Daniel A Hess
(74) *Attorney, Agent, or Firm* — Chernoff, Vilhauer, McClung & Stenzel, LLP

(57) ABSTRACT

A recycle/re-manufacturing program to enable the collection of products to re-use them in a re-manufacturing processes to create valuable products which can be also be broken down at the end of their lives and re-used. It has been found that the bio-plastic materials can be re-used up to ten times with no degradation in properties. Enabling multiple collections and re-use of the materials. A benefit is that tech factories receive clean waste streams and low-cost materials which can be re-used multiple times.

3 Claims, 14 Drawing Sheets

Extrude & Pelletize

APPARATUS, METHOD, AND SYSTEM FOR CAPTURING AND RE-MANUFACTURING WASTE

CROSS-REFERENCE TO RELATED APPLICATIONS

This application claims benefit of U.S. Provisional Patent Application No. 62/895,294 filed Sep. 3, 2019, the entire disclosure of which is hereby incorporated herein by reference for all purposes.

BACKGROUND OF THE INVENTION

The invention pertains to a system and method of remanufacturing any plant or petroleum based plastic component such as plant based recyclable cutlery utensils, containers and packaging and, more particularly, to a system and method that remanufactures such components or cutlery utensils by providing a collection area and process for return the components or cutlery utensils so they may be re-manufactured and re-dispensed.

Today, a substantial amount of waste or waste material from stores, convenience stores, fast food chains, restaurants, retail locations, offices, schools, and commercial, institutional, and government environments or locations is discarded by individuals (e.g. mainly consumers, employees, students) into waste receptacles (e.g. trash containers, trash receptacles, trash cans, garbage containers, garbage receptacles, and garbage cans) provided onsite. These waste receptacles typically are fitted with disposable plastic bags, which can be closed when filled, removed from the waste receptacles, and then disposed of in waste containers (e.g. trash cans, garbage cans, and dumpsters) usually located outside the buildings and/or adjacent to parking lots of these locations to facilitate removal by a waste disposal service.

Typically, the waste is not effectively sorted onsite, and all different types of waste are discarded into the same waste receptacles resulting in a wide variety of different types of waste mixed together, including trash, garbage, paper products, plastic products, food waste, and other waste items generally referred to as a general waste stream. The plastic bags filled with waste are thrown into a waste container (e.g., a trash can, a garbage can or a dumpster) and mixed with other loose waste or plastic bags containing waste. This waste is often transported in dumpsters carried by trucks or garbage trucks to landfills, and typically not sorted before being disposed in in the landfill.

Currently, there exists a need to recover reusable materials from the waste, which requires separating and/or sorting the waste into targeted waste to allow particularized waste to be effectively recycled. Once certain types of waste are mixed together, even subsequent separating and/or sorting may not allow the particularized waste to be effectively recycled due to the contamination of the targeted waste with other types of waste. In particular, waste plastic including food and food utensils (e.g. paper products, paper cups, paper plates, paper containers, plastic utensils, plastic cups, plastic containers, foam products, foam cups, foam plates, foam containers, cardboard products) should not be mixed with other types of waste to avoid contamination to facilitate such types of targeted waste to be recycled into new products suitable for contact and use with food and beverage that meet the standards and guidelines of the Food and Drug Administration (FDA). Further, to ensure proper handling of the waste food and beverage products, the custody of this waste from the point of disposal (e.g. waste receptacle located at a store or business) through the point of recycling of this waste is established, is tracked, is maintained, and/or is verified to reduce or otherwise eliminate additional contamination thereof. Thus, it is preferred that this type of waste be separated and/or sorted at the onsite location and maintained separate from the general or mixed waste stream throughout collecting, transporting, storing, and/or recycling thereof. However, if maintained separate in the way described herein it can be economically co-transported from facility to facility.

Specifically referring to the food industry, it is desirable that consumers (e.g. individuals, end users, customers, students, employees, workers, contractors) of food and beverage products begin the process of sorting the waste food and beverage products by placing these items in marked waste collection containers (e.g. receptacles, bins, vessels). For example, consumers place used paper cups or plastic bottles into separately marked waste collection containers to begin the process of effectively sorting different types of waste. For example, consumers place used food utensils into marked food utensil collection bins. The marked waste collection containers can be removed from the collection site and then readily transported to re-manufacturing facilities.

Due to increasing public, private, and government awareness and interest in being environmentally friendly, there exists renewed interest and demand for recycled products having greater percentages of recycled material content. Thus, this increased demand incentivizes new and effective systems and methods of recycling waste into renewable products.

In most restaurants, grocery stores, delis, or other eating areas, simple waste receptacles (e.g. trash containers, trash cans, garbage containers, garbage cans) are currently used to collect and remove waste from these environments or locations. Again, it is common to provide disposable plastic bags or liners in waste receptacles to facilitate removal and transfer of the waste to garbage cans, trash containers, trash cans, garbage containers, and dumpsters and to maintain a sanitary condition of the waste receptacles.

In order to more efficiently recycle waste plastic products including food utensils, such as targeted utensils to be recycled into food grade new products (e.g. plastic knives, forks, or spoons, containers, packaging), it is desirable to effectively identify targeted food utensils and products so that downstream sorting or misidentification resulting in improper materials entering the re-manufacturing stream can be reduced or otherwise avoided.

Further, it is desirable to collect the waste soon after use by the consumer, at the onsite environment or location where the waste was used, again this facilitates obtaining the waste material to be recycled before any mixing or contamination thereof with other waste materials. For example, new paper products are typically placed in contact or filled with food and beverages at a store (e.g. fast food establishments, cafes, restaurants, food courts, markets, convenience stores), a retail location, an office, a school, and commercial, institutional, and government environments or locations, and then consumed onsite. Thus, it is desirable to provide a waste collection device onsite that is configured to operate onsite, and capable of safely and effectively interfacing with consumers. The waste collection device is preferably configured to identify acceptable recyclable materials, allow for deposit of the desired materials into the waste collection device, inhibit depositing of materials of an incorrect type into the waste collection device, and to interface with users of the waste collection device or waste collection device administrators.

Current Waste Recycling

Currently, there are some stores attempting to separate and collect different types of waste by using multiple waste receptacles, each of which is marked for a particular type of waste. However, it is not evident if this separated waste is stored, maintained, and/or picked up separately from these stores based on the particular type of waste, or subsequently mixed together, for example, by being thrown together into the same dumpster prior to transportation from a store.

By far the most common manner of waste disposal used by consumers, is to dispose all types of waste into a common waste receptacle resulting in immediate mixing and contamination of the waste. Specifically, wastepaper products, plastic products, and food waste end up being thrown into the same common waste receptacle, and then typically subsequently transferred to a garbage can or dumpster for transportation to a waste disposal location (e.g. land fill) or a waste collection/processing location. The waste is contaminated while sitting in the common waste receptacle, and continues to be further contaminated with time, transportation, and handling prior to subsequent disposal, subsequent collection and/or subsequent processing.

There are no systems for marking, tagging, and/or otherwise identifying waste prior to it being placed into waste receptacles. There are similarly no waste containers that identify the type of waste entered into each individual waste receptacle and waste container. Even further, there are no systems for maintaining and/or verifying the custody of separated waste, in particular targeted waste, contained in disposable or recyclable waste containers from the point of collection to the point of processing the recycling to ensure that the waste remains unmingled at the time and place of processing the recycling.

SUMMARY OF THE INVENTION

In one exemplary embodiment, the system provides customers with plastic components and provides for collection points for the components. In an embodiment, a variety of plant-based or petroleum-based food utensils, containers and packaging such as bowls, lids and other food service articles are provided to consumers. The consumers obtain the food service articles from the distribution points, use the food service articles, then return the food service articles so that the articles can be cleaned and re-manufactured. Collection points are provided to facilitate the collection and sorting of the returned food service articles. After collection, the articles may be re-manufactured into useful products multiple times before composting at the end of life.

In another exemplary embodiment, the system provides a closed loop recycle/re-manufacturing program to enable the collection of products to re-use them in a re-manufacturing processes to create valuable products which can be also be broken down at the end of their lives and re-used. It has been found that the bio-plastic materials can be re-used up to ten times with no degradation in properties. Enabling multiple collections and re-use of the materials. One exemplary benefit is that tech factories receive clean waste streams and low-cost materials which can be re-used multiple times. Customers gain assurance that their materials are being collected and processed properly. Users of the system, including direct customers and customers of the direct customers, potentially benefit from a rebate program for each pound which is collected as well as a rewards system for participating.

The foregoing and other objectives and features of the invention will be more readily understood upon consideration of the following detailed description of the invention taken in conjunction with the accompanying drawings.

DETAILED DESCRIPTION OF THE PREFERRED EMBODIMENTS

Figure 1:
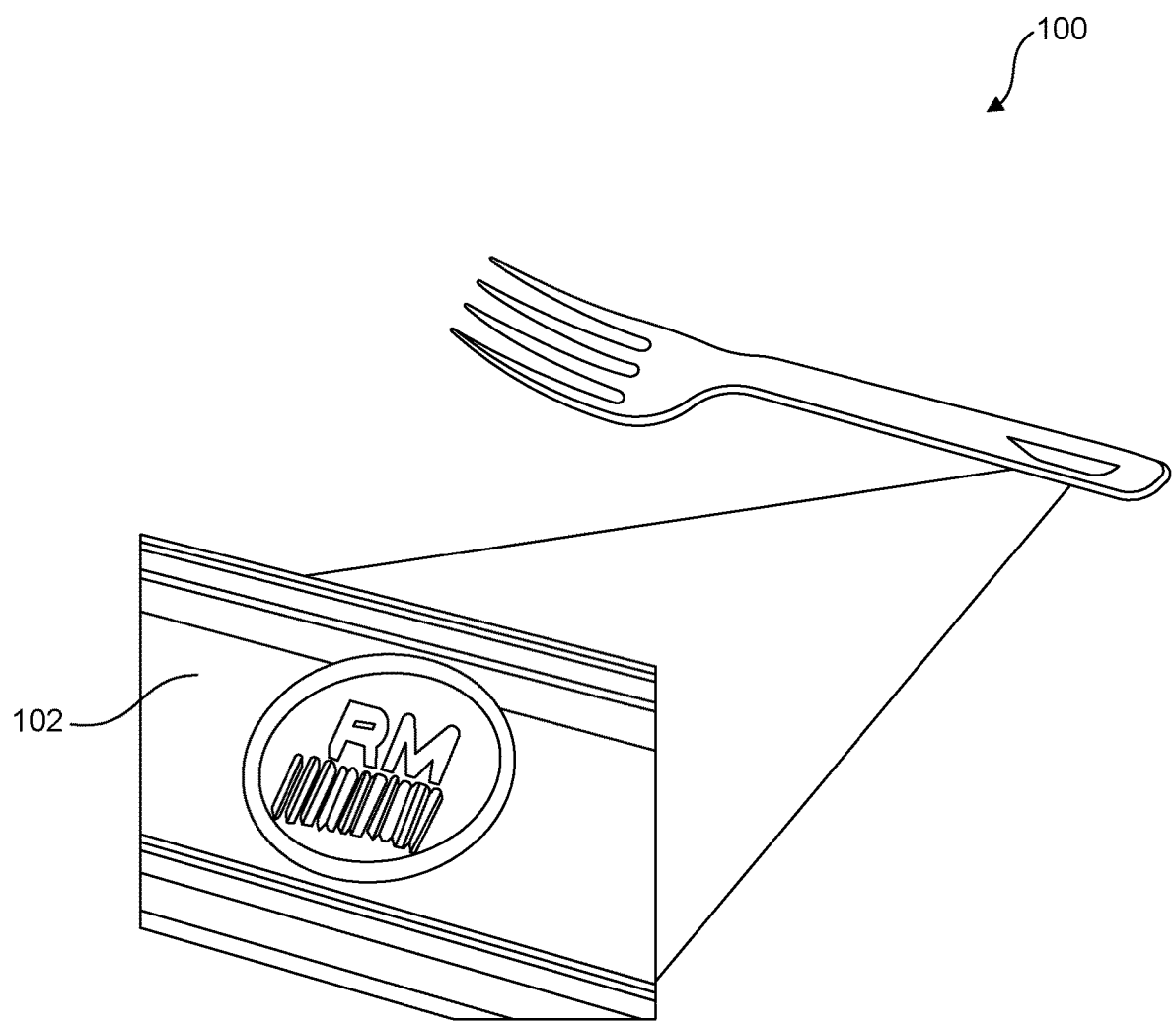
FIG. 1 is an expanded view of an example of a logo and code on a recyclable eating utensil.

In the following detailed Description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed Description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method, system, and apparatus include the discussed feature, advantage or mode of operation. The following Description of the preferred embodiment is merely exemplary in nature and is in no way intended to limit the invention, its application, or use.

There has thus been broadly outlined the more important features of the invention in order that the detailed Description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

Turning now to the included Figures, that will be described together, there is presented a closed-loop system for identifying and collecting plant-based products and re-manufacturing them into useful products multiple times before composting at the end of life.

Referring to FIG. 1, a recyclable fork 100 with an identification brand logo and code 102 is placed on or otherwise molded into the exterior surface its body in a visible location to the user. The logo and code may be in the form of bars, lines or other elements such as numbers and simple graphics, as long as the logo and code are able to inform the consumer that the recyclable fork component is unique and different than other components. The logo will become ubiquitous with re-manufacturing. In a preferred embodiment, the code is specific to re-manufacturing and is to be protected and will comprise of lines of length and width and spacing which create a unique pattern for scanning purposes. Other more complex patterns may also be employed. The code allows a collection bin to identify the fork as an acceptable product and it will be permitted to enter the collection bin. In some other embodiments, the brand logo and code is not limited to being placed on utensils themselves, but can be placed on virtually any plastic or metal or elastomeric part for the purpose of collection and re-use or re-manufacturing. As shown in FIG. 1, the fork is only an example, and in some other embodiments, other utensils or containers such as plates and bowls may also be used. The material of the utensils and containers may be petroleum-based plastic, or some other form of bio-plastic, such as plant materials.

Referring also to FIGS. 2-6 are views of an example of a collection bin and illustrations depicting the scanning and collecting of re-manufacturable (RM) components. The collection bin 200 generally comprises a body 206 and a top 202, with a recess 210 in the top. In a preferred embodiment, on the top 202 is mounted an arm 204 with a scanner 208. In some embodiments, there may be only a scanner and no arm, so long as the scanner is visible to a user of the bin. The arm 204 may either be rigid or constructed from flexible material, as long as the arm is of sufficient dimension and angle to allow for the item to be scanned. The scanner 208 operates to scan the item that is being attempted to be deposited into the bin through the recess 210, such as a recyclable fork of FIG. 1. The scanner 208 may include additional components not shown in the figures, such as a charge-coupled device (CCD) array, mirrors, a scan head, a glass plate, a lamp, lens, cover, filters, stabilizer bars, belt, power supply, interface ports, and/or other necessary circuitry. The collection bin may be constructed from recyclable material or other materials, so long as the material is durable.

Figure 2:
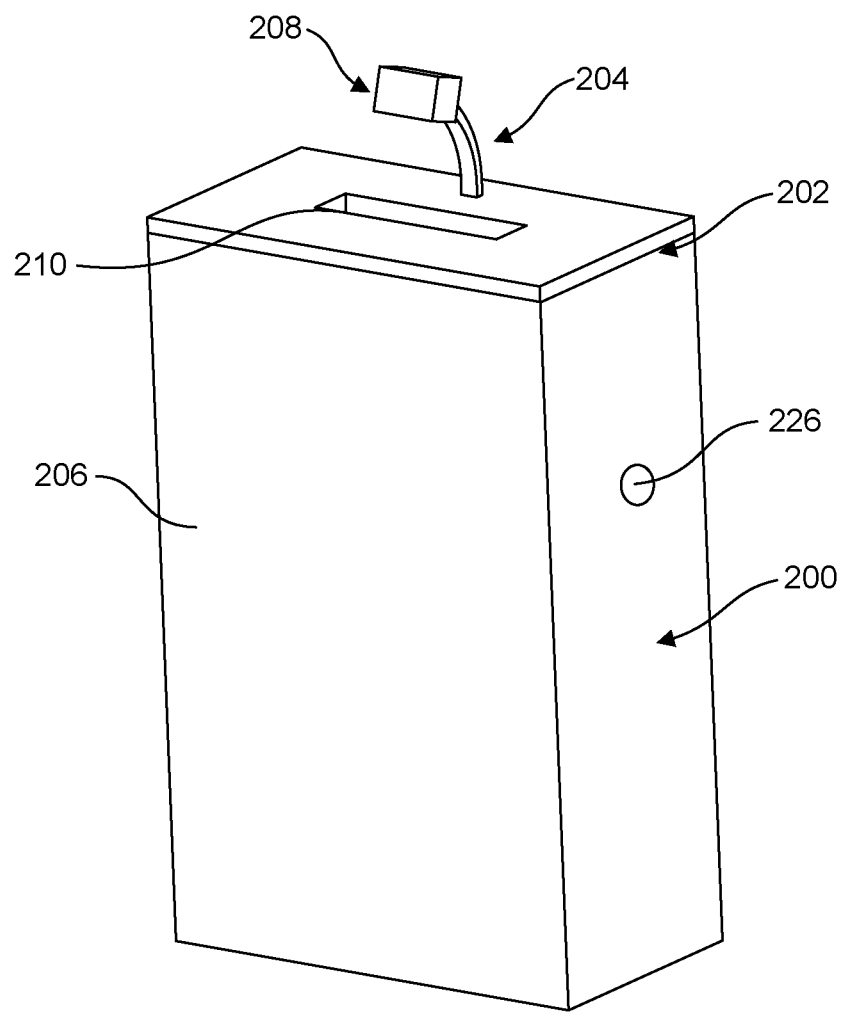
FIG. 2 is a bottom perspective view of an example of a collection bin with a scanner for collecting recyclable eating utensils.
Figure 3:
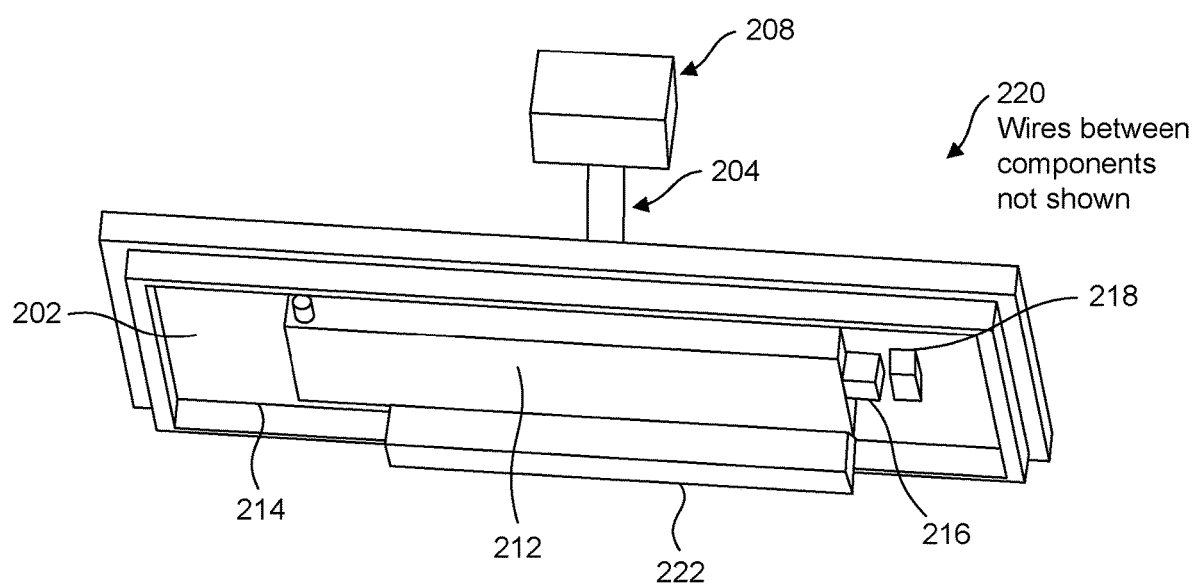
FIG. 3 is a component view of a collection bin of FIG. 2 with a closed trapdoor, a solenoid, and a magnet or mechanical catch.
Figure 4:
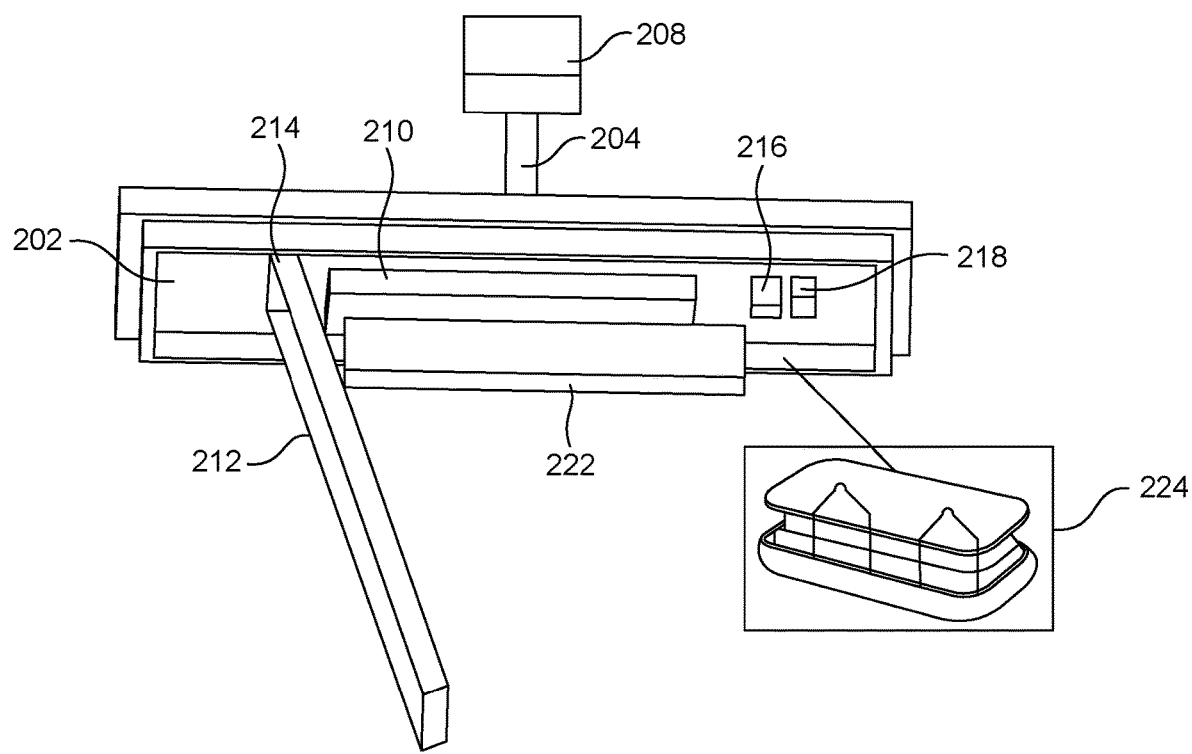
FIG. 4 is a component view of a collection bin of FIG. 2 with an open trapdoor, a solenoid, and a magnet or mechanical catch.

As shown in FIGS. 3-6, the interior of the bin 200 around the top 202 may comprise of a recess 210, a trap door 212, a pin 214 or other elements configured to open the trap door in a swinging mechanism, and any other necessary components such as magnetic members and/or a mechanical catch 216, a solenoid 218 or other components, a programmable logic controller (PLC) 222, and wires 220 (not shown in FIG. 3) and any other desired circuitry. In some embodiments, the shape or the trap door may not be in a rectangle, and may be any shape so long as the dimensions are large enough for the items to be deposited. In some embodiments, the recess may correspond in shape to the desired item to be disposed. Further, other elements akin to a pin 214 may be implemented, such as a hinge, so long as the element allows the trap door 212 to open, preferably in a hinging mechanism. In some embodiments, the trap door 212 may be in the form of a lid that swings open in an upward direction, akin to a waste disposal bin, as opposed to a trap door swinging downwards. The PLC 222 may include additional components not shown in the figures, such as a power supply, a central processing unit (CPU or processor), co-processor modules, input and output modules (I/O), and/or a peripheral device. As shown in FIG. 4, the bin 200 may also include additional components, such as a sanitizer 224 where the sanitizer may eliminate bacteria, viruses and other microbes through light, spray or other sanitizing means. The sanitizer may be located on the exterior or located in the interior of the top of the bin. As shown in FIG. 2, the body 206 or top 202 of the bin may also include a position sensor 226 located on the exterior or interior of the bin, where the sensor emits a signal when the bin reaches a specified capacity of items, so that a user will know to collect and empty the bin.

Figure 5:
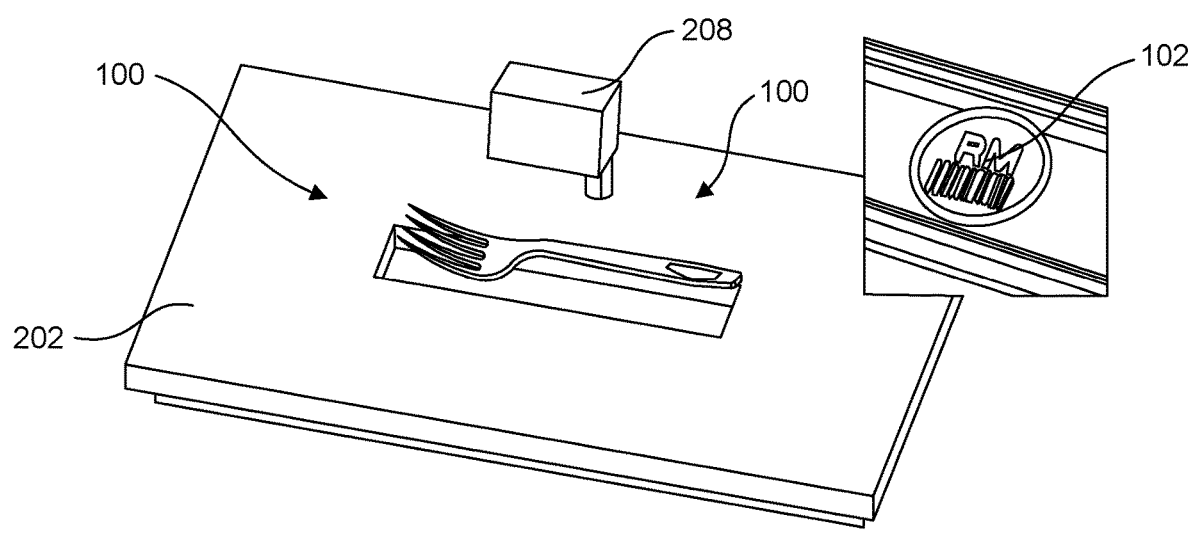
FIG. 5 is a component view of a scanner of a collection bin of FIG. 2 scanning the code of a fork prior to entry into the collection bin.
Figure 6:
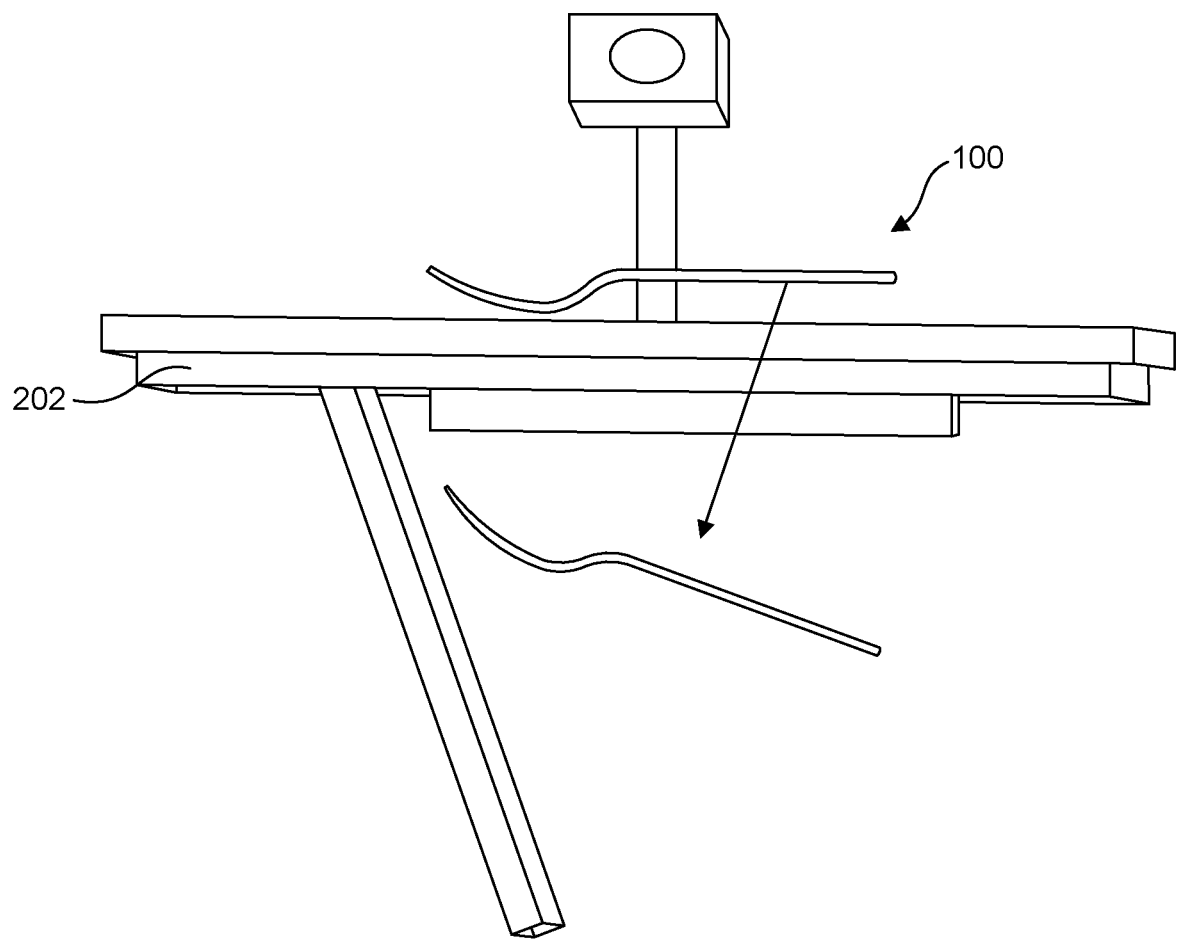
FIG. 6 is a view of a fork during the scanning process, and the fork after being scanned and entering the collection bin of FIG. 2.

As shown in FIGS. 4-6, upon scanning, if the RM component (e.g., fork with a code) is declared to have the proper code by the scanner and considered allowable by the PLC, then the magnet or mechanical catch on a trapdoor is subsequently released, allowing the trapdoor to swing or otherwise open, allow the RM component to fall through the trapdoor into the bin, where the trapdoor is subsequently closed by the magnet or mechanical catch. If the item being deposited into the collection bin is not an RM with the correct component as determined by the scanner and, then the trapdoor remains closed barring entry of the component. An example system for allowing entry of an RM with the correct code is as follows:

1. Scanner 208 indicates a light signal to the PLC 222;
2. PLC 222 signals the solenoid 218 with a 24-volt signal;
3. Solenoid 218 de-activates the electro-magnetic or releases a spring-loaded latch 216;
4. The trap door swings down from the pin 214;
5. The product 100 falls into the collection bin 200; and
6. PLC 222 signals the solenoid 218 which activates electro-magnet or spring-loaded catch 216 and closes the trap door 212.

Figure 7:
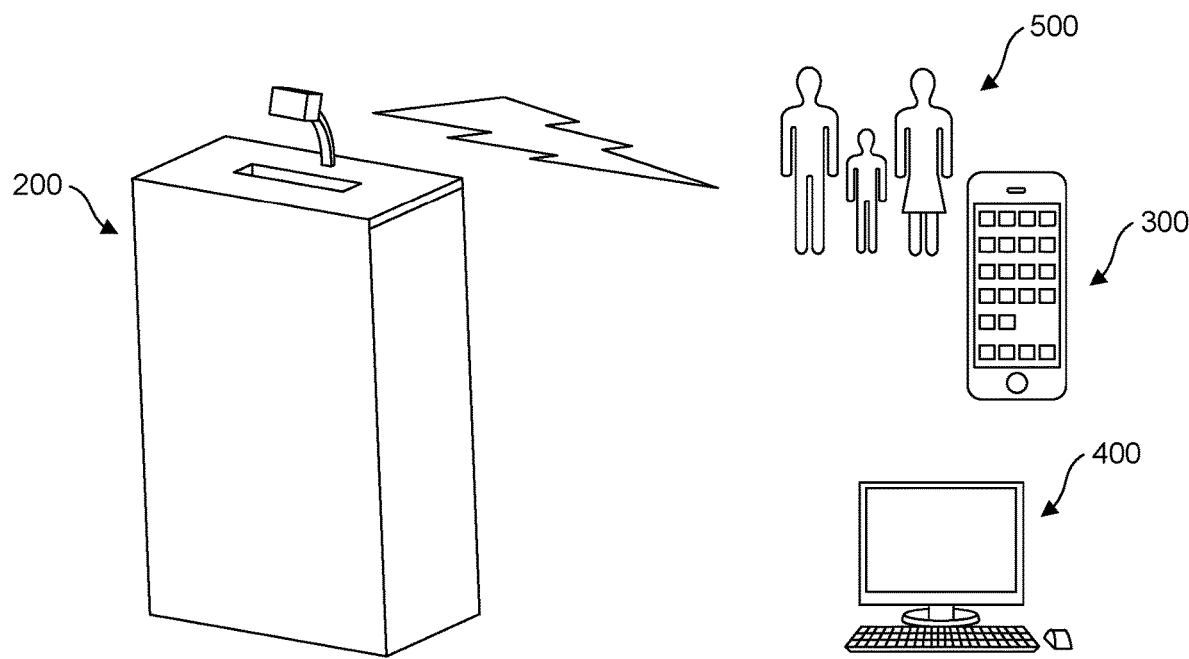
FIG. 7 is a system view of an example of notification methods for sending thanks or notifications to users for using the collection bin of FIG. 2.
Figure 8:
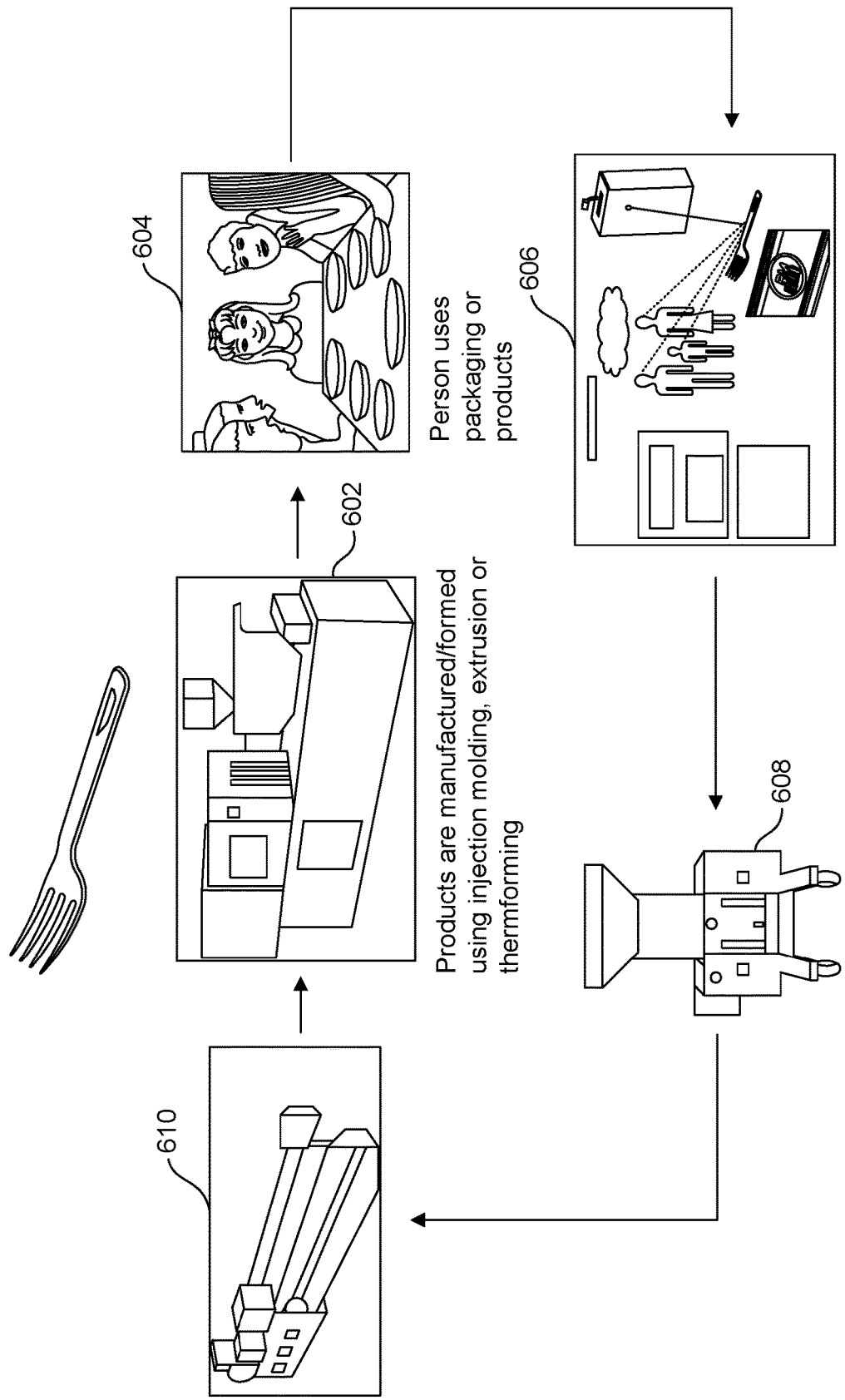
FIG. 8 is a system view of a re-manufacturing system for plastic products after using the collection bin of FIG. 2.

Referring now to FIGS. 7-8, a system view is illustrated of an example of notification technique for sending thanks or notifications to users for using the system 500. When RM products are dispensed into the bin 200, in some embodiments the code 102 on the product 100 can be associated to a specific user account through a notification sent via a communication network such as the Internet or a bluetooth connection (not shown), so that the notification may be viewable on a user's mobile phone 300 or on a computer device 400. In some embodiments, the information associated with a specific user account or details may also be transmitted through a communication network and stored on a server (not shown) or a local area network (LAN), or the cloud. In some embodiments, no association is made when the item is disposed successfully into the bin. Upon collection, the RM code is scanned at the collection bin. In some embodiments where no association is initially made, an audible message such as "Thank you for Re-manufacturing" can be played to the user to signal to the user that the item has been collected successfully. Other audible messages may be played, such as a simple sound. In some embodiments where associations are made, a signal can be generated and sent to the user associated with the RM code. The system could send a bluetooth or other analogous wireless signal to users either thanking them, providing them with a reward, or potentially both. The system 500 could also provide data on collections and also signal when the bin 200 needs to be emptied, if the bin also has a position sensor 226 installed within.

Referring now to FIG. 8, there is shown a system view of a re-manufacturing system 600 for plastic components, and in the pictured embodiment, for food utensil products. In one step, the raw materials for the food utensil products are manufactured 602. This process can be repeated as many times as possible in order to maximize efficiency and repeated use of the materials. The products can be manufactured using injection molding, extrusion or thermoforming. Once a person uses the products 604, the products with the correct codes are placed into collection stations 606. From the collection stations, the products are collected, sanitized and ground down 608. The ground down material is reintroduced to the manufacturing process 601, where additional products are then made from the collected material. There may be additional steps (not shown) that are added to the re-manufacturing system, such as cleaning and sanitization of the products upon collection 606, and delivery of the products and materials between various steps.

Figure 9:
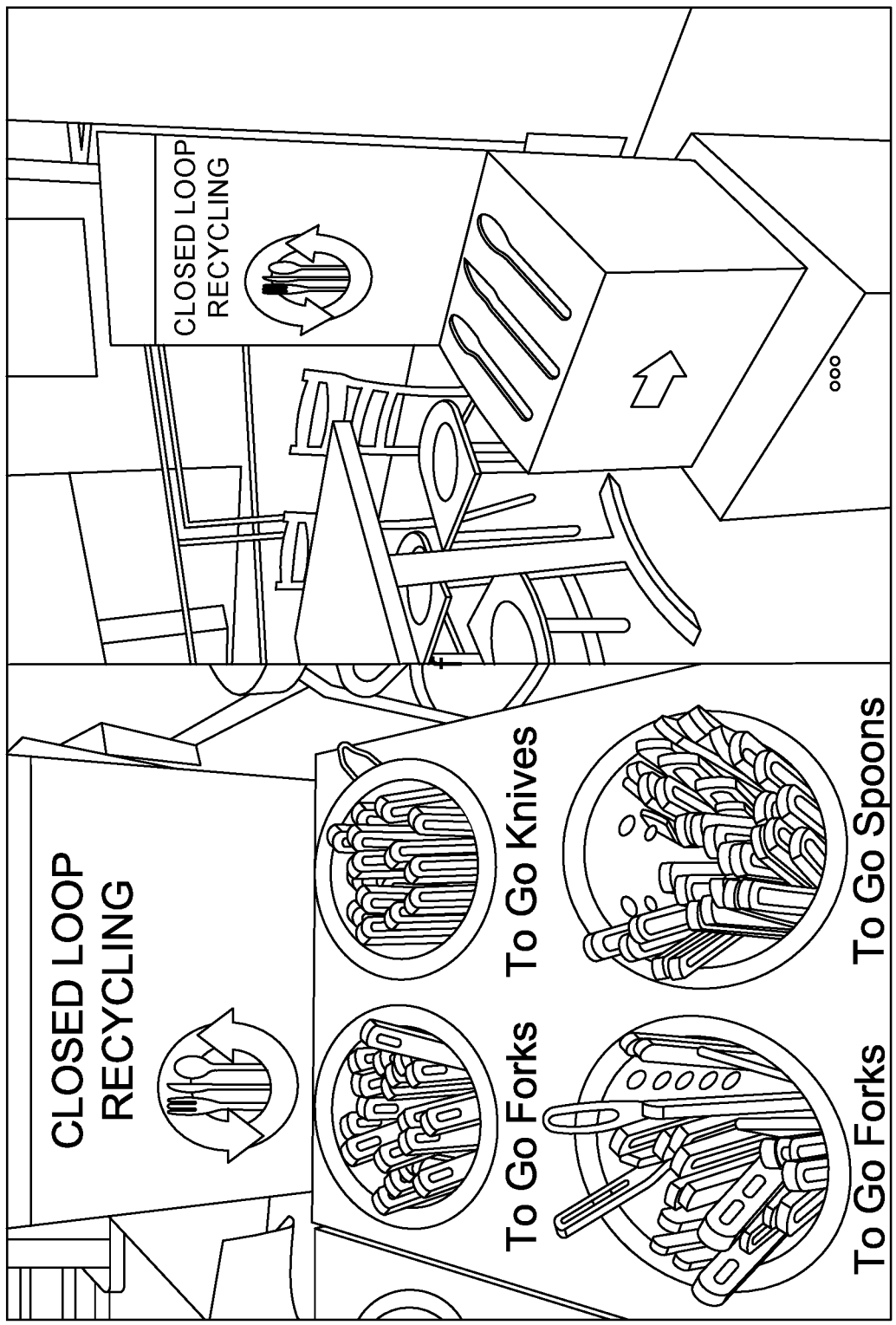
FIG. 9 are photographs of examples of closed loop recycling station utensil distribution and collection centers.

Referring now to FIG. 9, there is shown an example of a closed loop recycling system dispensing area and collection station. As shown in the left photograph, the dispensing area has clean, ready to use utensils and can include media informing users of the benefits of recycling and how the system operates. As shown in the right of FIG. 9, the collection station invites users to deposit their compostable materials and instructs the users where to place the appropriate utensil. A trap door over each collection portal blocks the addition of any materials unless they are confirmed with a scan by reading the code molded into the plastic part. This system can be used with virtually any plastic part to ensure proper collection and a clean waste stream returning to the manufacturer for re-manufacturing. In some embodiments, there may be only one type of utensils collected through the system.

Figure 10:
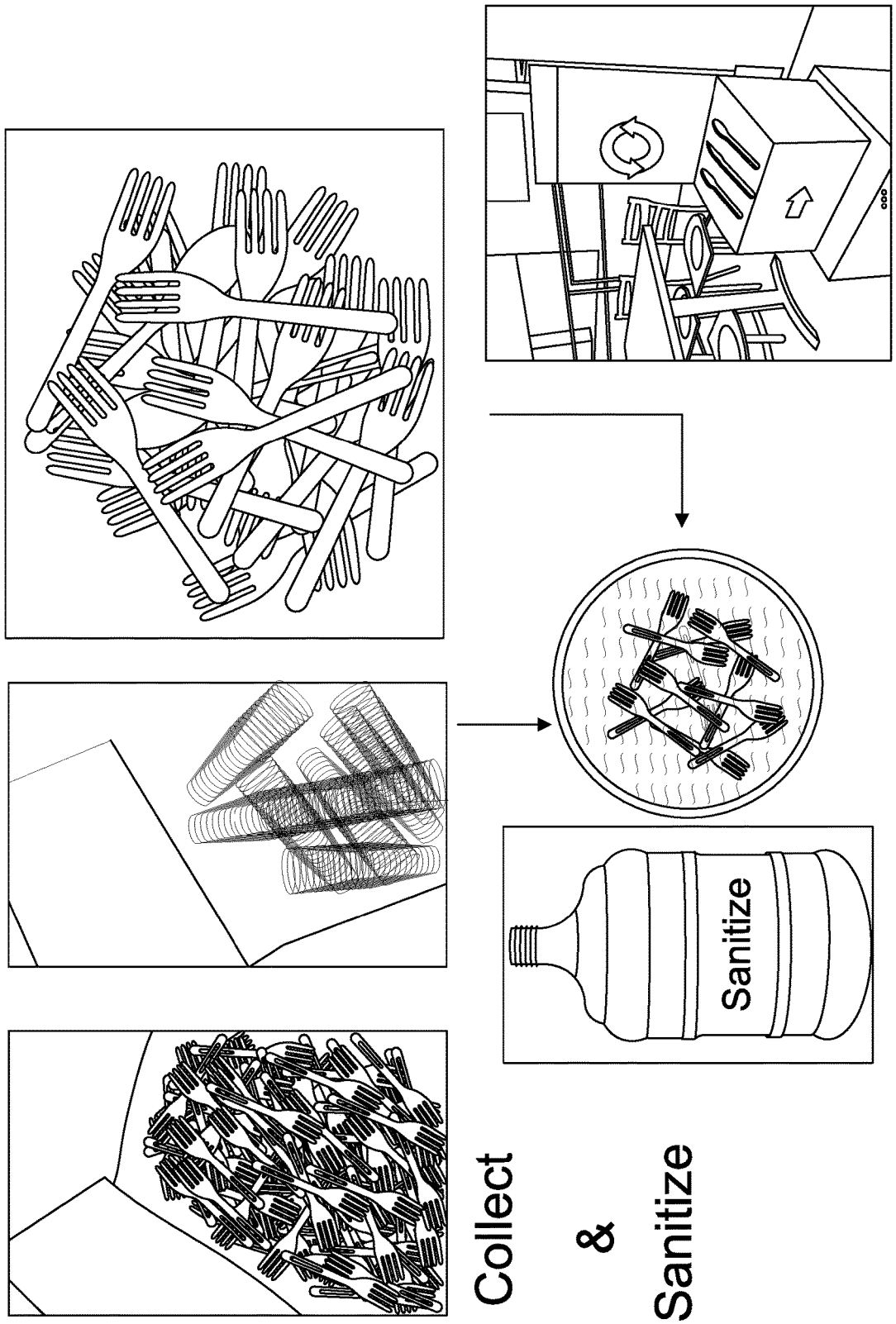
FIG. 10 is a series of photographs showing the collection and sanitization phase of a closed loop recycling system of FIG. 9.
Figure 11:
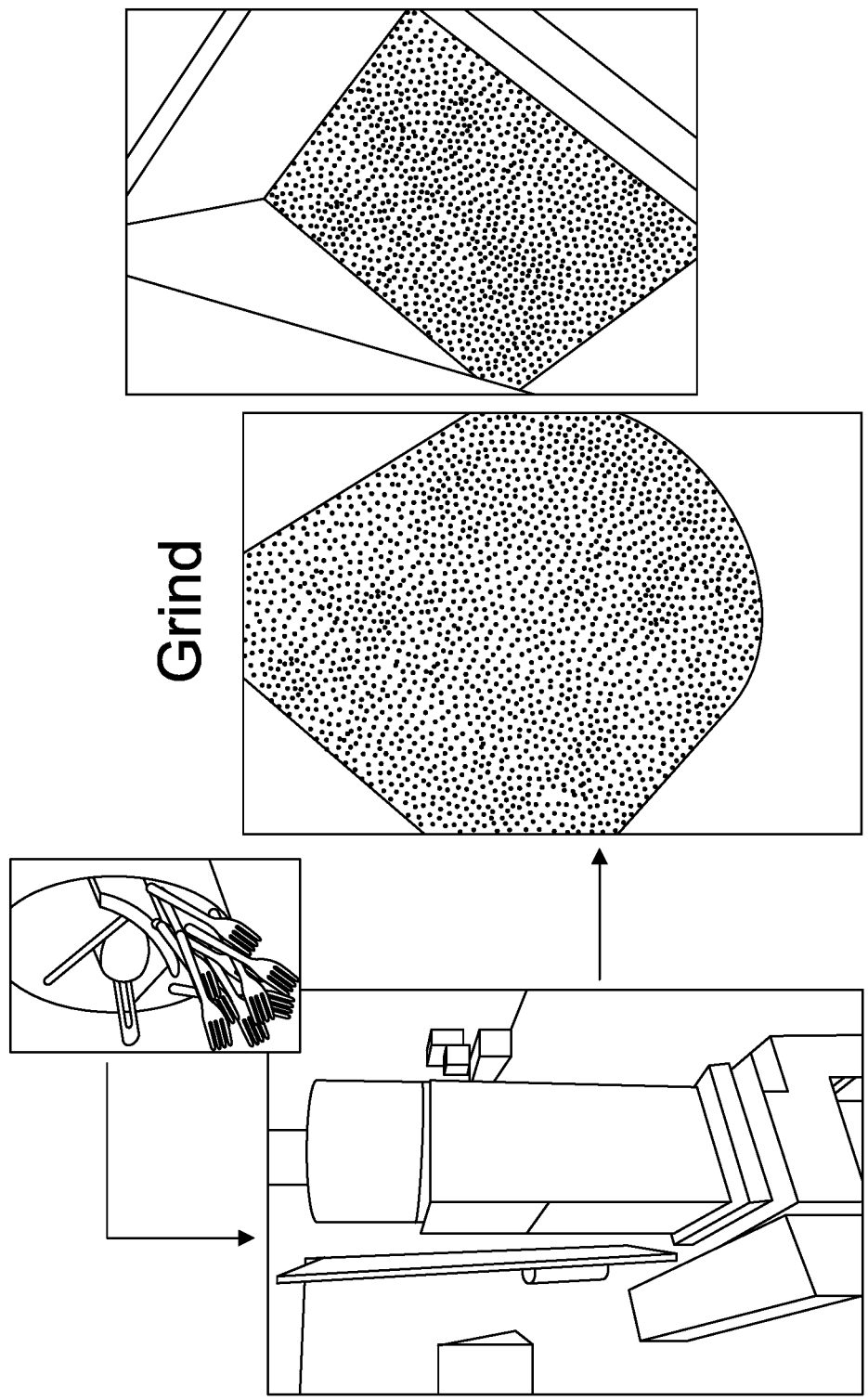
FIG. 11 is a series of photographs showing the grinding phase of a closed loop recycling system of FIG. 9.
Figure 12:
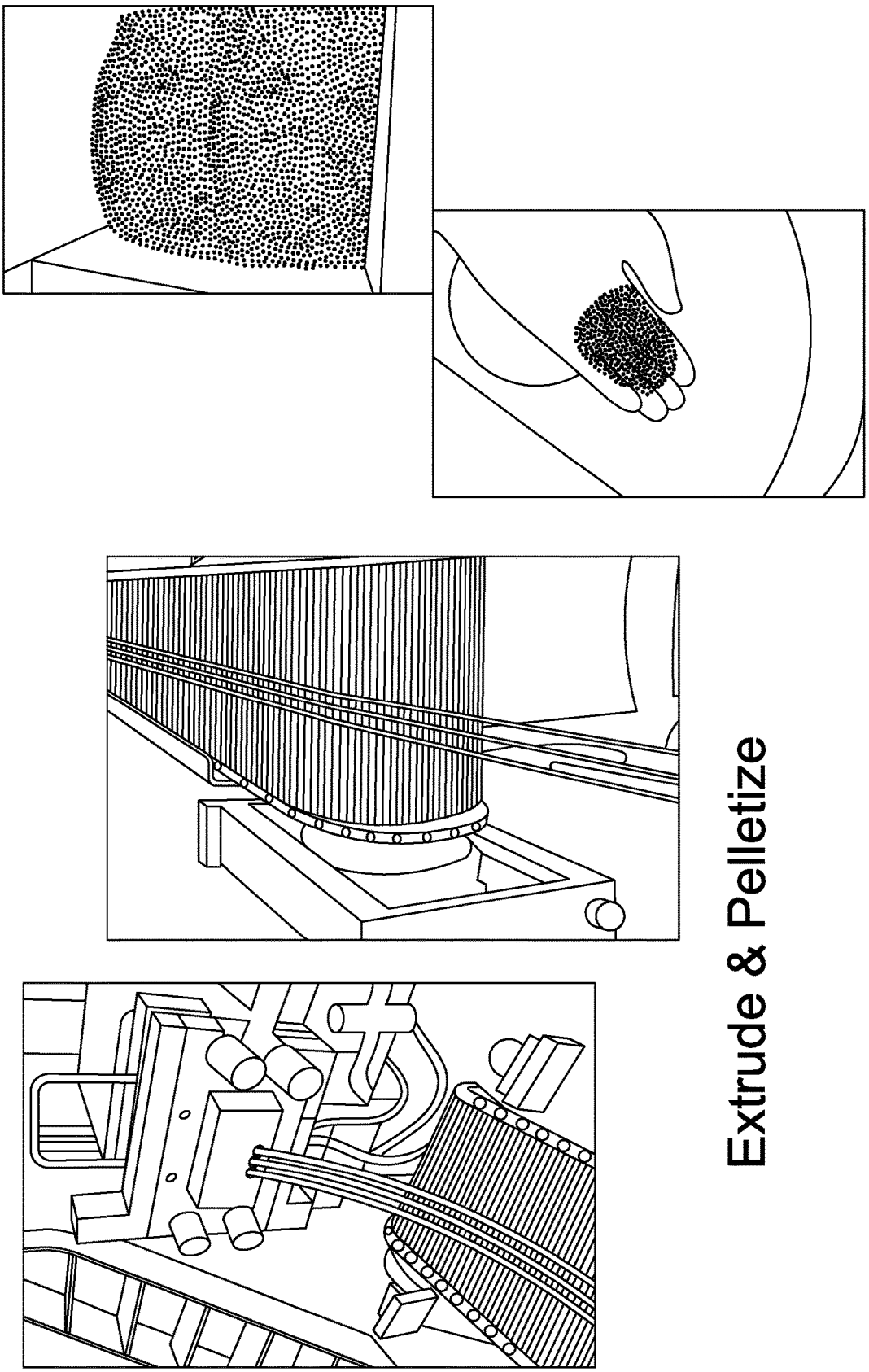
FIG. 12 is a series of photographs showing the extruding phase of a closed loop recycling system of FIG. 9.
Figure 13:
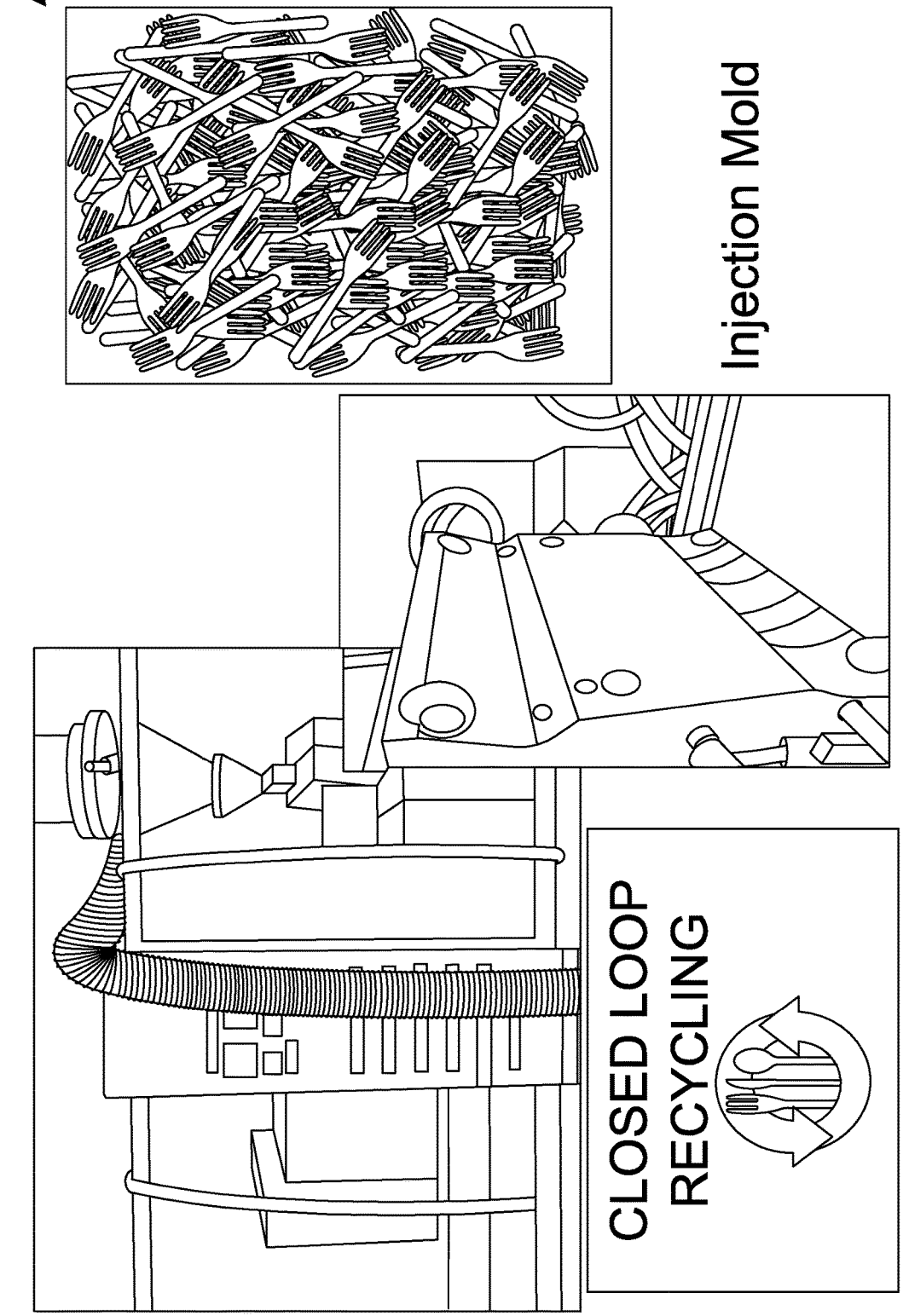
FIG. 13 is a series of photographs showing the injection modeling of a closed loop recycling system of FIG. 9.

Referring to FIGS. 10-13, there are photographs illustrating an example of the process of collection and re-manufacturing food utensils or other plastic components. As shown in FIG. 10, in the beginning steps of the process, products such as forks, knives, spoons and cups are collected and sanitized. Because of the selective collection feature of the collection bins, the products are properly sorted during collection. As shown in FIG. 11, during another step of the process, the collected and cleaned materials are ground down appropriately sized pieces that can be used in other subsequent steps. As shown in FIG. 12, during yet another step of the process, the ground pellet-sized shapes are further extruded and pelletized, so that the pellets may be of suitable size and shape for the injection-molding step. As shown in FIG. 13, in the injection-mold step, the pellets are formed into new plastic components. In this step, there may be additional materials added to the pellets to help form the new plastic components into the pictured embodiments such as plastic utensil products, for use by consumers. As discussed, this process is repeatable for as long as necessary, and as such is a highly sustainable method. Additional steps may be included in this process to help make the process cheaper, more efficient, and more scalable.

Figure 14:
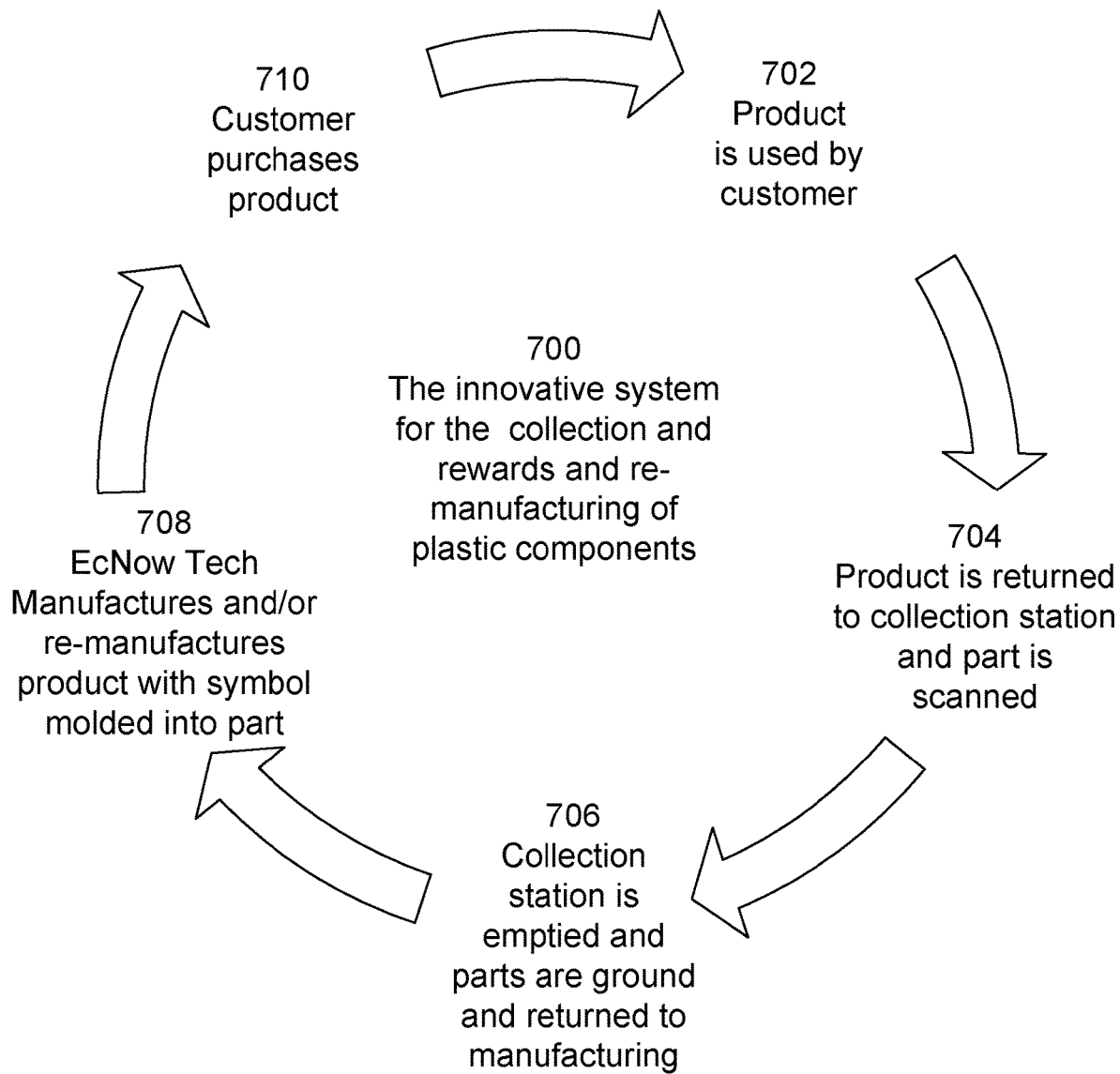
FIG. 14 is a flowchart showing the lifecycle of a recyclable product including use and re-manufacturing phases.

Referring now to FIG. 14, there is shown a flowchart of the example of a lifecycle 700 of a recyclable product including use and re-manufacturing phases in the present disclosure. The lifecycle represents the different phases of the innovative system for the collection, rewarding, and re-manufacturing of plastic components. In a step of the process 702, a customer purchases a recyclable product. The product is used by the customer, presumably while eating a meal or food on the premises of the establishment. After the meal is consumed, the product is returned to the collection station and the part is scanned 704. If the code on the part is of the appropriate type, the trap door on the collection station will open and the product is accepted.

After being accepted by the collection station, another step of the process comprises the collection station being emptied 706. Parts are ground, and in some embodiments cleaned, then returned to manufacturing where they are processed and prepared for re-manufacturing.

Another phase of the process comprises the re-manufacturing of the product 708. The product is made with the identification logo molded into part of the product so that the scanner on the collection bin can identify the part. Upon re-manufacture, the product may then be purchased by the customer 710.

Contamination and sorting of products is a major challenge in recycling. This will reduce the likelihood of contamination by having only RM products with the correct code received by the collection station. A clean waste stream is key to producing high value re-manufactured products.

Some people will recycle products of the present invention because they feel good about it and others will recycle because they receive a reward. The system enables motivation for customers to recycle.

Some companies are motivated by recycling because it is part of their corporate goals. Others are only business driven. This system allows for the collection of data on products collected for re-manufacturing which also for marketing of positive efforts in environmental management as well as suppliers can provide a rebate on the number of pounds collected for re-manufacturing.

The collection station could also be outfitted with an Infrared (IR) light to reduce smells from food waste which is attached to packaging and serving products. The IR light could be used to sanitize products in the container.

In the foregoing specification, the invention has been described with reference to specific embodiments. However, it will be appreciated that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above regarding specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprise," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The above detailed Description sets forth rather broadly the more important features of the present invention in order that its contributions to the art may be better appreciated. As such, those skilled in the art will appreciate that the conception, upon which disclosure is based, may readily be utilized as a basis for designing other structures, methods, and systems for carrying out the several purposes of the present invention. It is important, therefore, that this Description be regarded as including such equivalent constructions insofar as they do not depart from the spirit and scope of the present invention.

Although certain example methods, apparatus and articles of manufacture have been described herein, the scope of coverage of this provisional patent application is not limited thereto. On the contrary, this provisional patent application covers all methods, apparatus and articles of manufacture fairly falling within the scope of the invention either literally or under the doctrine of equivalents.

To the extent the above specification describes example components and functions with reference to compliance requirements, standards and/or protocols, it is understood that the teachings of this disclosure are not limited to such compliance requirements, standards and/or protocols. Such compliance requirements, standards and/or protocols are periodically superseded or revised by newer versions. Accordingly, replacement compliance requirements, standards and/or protocols having the same general functions are equivalents which are intended to be included within the scope of this Description.

Therefore, the foregoing is considered as illustrative only of the principles of the present invention. Further, since numerous modifications and changes will readily occur to those skilled in the art, it is not desired to limit the present invention to the exact construction and operation described, and accordingly, all suitable modifications and equivalents may be resorted to, falling within the scope of the present invention. While the above Description describes various embodiments, it will be clear that the present invention may be otherwise easily adapted to fit any configuration as desired or required.

As various changes could be made in the above embodiments without departing from the scope of the invention, it is intended that all matter contained in the above Description shall be interpreted as illustrative and not in a limiting sense.

What is claimed is:

1. A recycling and remanufacturing system that includes deposited items, comprising:
   (a) a waste repository for collecting the deposited items, the waste repository having a top and a body, wherein the top comprises a scanner, a recess, a door configured to selectively open, a locking mechanism, and a programmable component;
   (b) said deposited items including a plastic product, in the form of an eating utensil, sized to be capable of being deposited into the waste repository, said recess shaped to have a lower surface and a side surface defining an upwardly facing recess wherein said waste repository does not include a top surface capable of covering said recess, said recess configured to receive said plastic product from a location above said recess to be deposited into the waste repository where the plastic product has a scannable code on a surface thereof and a logo on said surface thereof both of which indicate the product is recyclable, both of which are on its exterior thereof, said recess configured to allow said plastic product to be removed from said recess from the location above said recess after being scanned without opening said waste repository;
   (c) wherein the programmable component is configured to:
      (i) receive information from the scanner regarding the code when the plastic product is positioned in the recess while the plastic product remains on the exterior of the waste repository, wherein while said plastic product is positioned in the recess it is readily removable from said recess without opening any portion of said waste repository, wherein said plastic product is viewable while being said positioned in the recess after being scanned from the exterior of said waste repository from a location above said waste repository;
      (ii) based upon said information confirm that the code from the scanner corresponds to a desired code indicating the plastic product is recyclable;
      (iii) generate a signal to the locking mechanism of the door, in response to the desired code indicating the plastic product is recyclable, to unlock the door to allow the product to be deposited only into a single interior receptacle in the waste repository, said waste repository includes only a single interior receptacle where all plastic products are deposited, wherein all products deposited into said waste repository are maintained together in the single interior receptacle in touching contact with one another until said waste repository is opened to retrieve all products deposited into the single interior receptacle of said waste repository, wherein none of the products deposited into said waste repository are removable from the interior of said waste repository apart from said single interior receptacle where the products are maintained together, wherein upon receiving said plastic product within said waste repository there is no mechanism by which any of said plastic products are retrievable apart from said single interior receptacle of the waste repository, wherein said recycling and remanufacturing system is incapable of crushing said plastic product and said plastic product is deposited into the waste repository without being crushed, wherein all said products maintained in said single interior receptable are deposited in a non-crushed form, wherein there is only a single path from said recess to said single interior receptacle that said plastic products are capable of traveling within said waste repository;

(iv) generate a signal to the locking mechanism of the door to lock the door, after the plastic product is deposited into the waste repository;
(v) based upon said information not confirming that the code indicates the plastic product is recyclable when the plastic product is positioned in the recess, the programmable component does not generate the signal to the locking mechanism of the door to unlock the door, wherein said product remains in said recess until-removed and does not pass into the interior of the waste repository as a result of the signal from the scanning.

2. The recycle and remanufacturing system of claim 1, where the waste repository further comprises a solenoid, where the solenoid is configured to receive instructions from the programmable component to activate the locking mechanism of the door.

3. The recycle and remanufacturing system of claim 2, where the code is a bar code.

* * * * *